May 16, 1933.   E. G. DANIELSON   1,908,694
VARIABLE CONDENSER
Filed Dec. 8, 1930
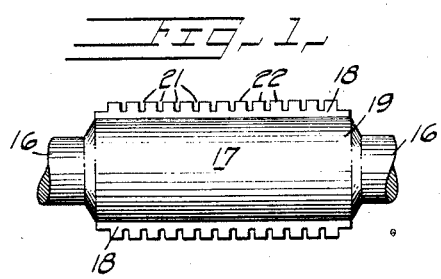
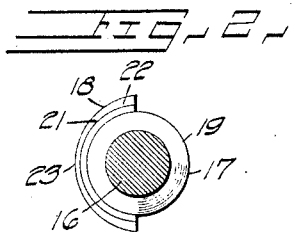
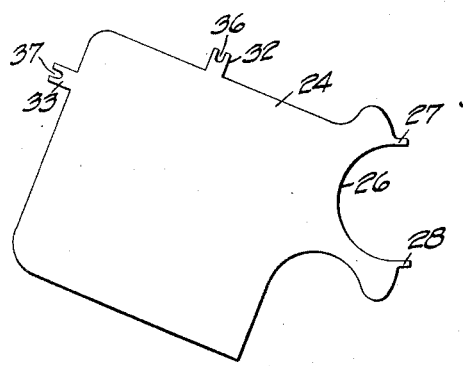
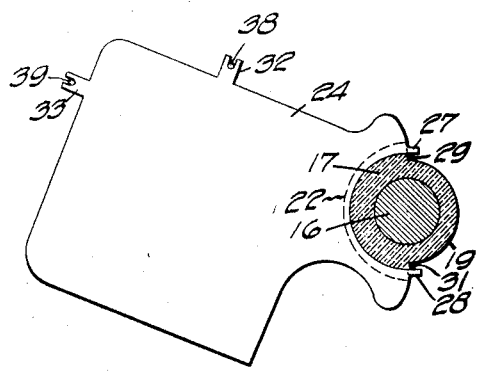
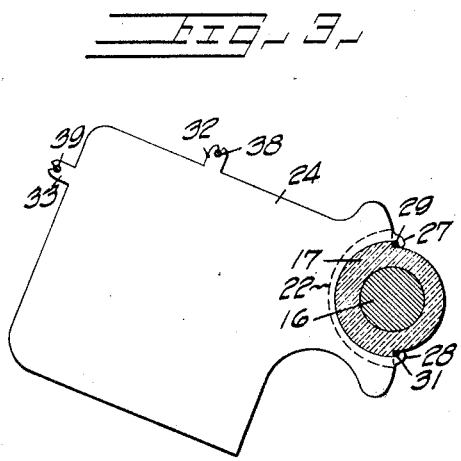
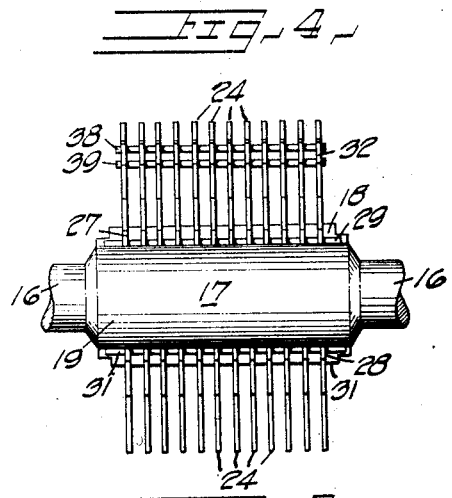
INVENTOR.
ERNEST G. DANIELSON
BY
White, Prost, Flehr & Lothrop
ATTORNEYS.

Patented May 16, 1933

1,908,694

UNITED STATES PATENT OFFICE

ERNEST G. DANIELSON, OF SAN FRANCISCO, CALIFORNIA, ASSIGNOR TO GRAY & DANIELSON MANUFACTURING COMPANY, OF SAN FRANCISCO, CALIFORNIA, A CO-PARTNERSHIP CONSISTING OF ERNEST G. DANIELSON AND THOMAS B. GRAY

VARIABLE CONDENSER

Application filed December 8, 1930. Serial No. 500,851.

This invention relates generally to variable electrical condensers of the type utilizing spaced plates or electrodes adapted to interleave, such as are commonly used for tuning electrical circuits, and to methods of manufacturing the same.

It is an object of the present invention to devise an improved mounting for the plates of a variable condenser, whereby such condensers can be readily manufactured with a high degree of accuracy and mechanical strength.

These and other objects and advantages are attained in the embodiment of my invention illustrated in the accompanying drawing, in which:

Fig. 1 is a view showing a portion of a shaft provided with an insulating sleeve upon which the plates of my condenser are adapted to be mounted.

Fig. 2 is an end view of the shaft and sleeve shown in Fig. 1.

Fig. 3 is a plan view of one of the plates of the condenser before it has been mounted on the shaft.

Fig. 4 is a view illustrating the manner in which the plates are assembled on the shaft and before they have been secured thereto.

Fig. 5 is an end view of the condenser illustrating the manner in which the plates are secured to one another and to the shaft.

Fig. 6 is a front view of the condenser shown in Fig. 5.

Heretofore, it has been common in variable condensers to employ two sets of spaced parallel plates which are adapted to interleave with each other, at least one of the sets of plates being movable relative to the other so that the extent of overlap can be varied and thereby change the effective capacity of the condenser. Sometimes both sets of plates are made movable and for this purpose they can be mounted on rotatable shafts journaled in a supporting frame, a condenser of this type being disclosed in Patent No. 1,618,399, granted February 22, 1927, to R. M. Wise and E. G. Danielson. The principles of the present invention are applicable to both of these general types of condensers.

Usually, one set of plates is insulated from the other set and one feature of my invention is the novel manner in which the plates of the respective sets are insulated from one another without weakening the structure of the device. In its preferred form the condenser of my invention comprises a plurality of parallel plates mounted on a sleeve of insulating material disposed about a shaft which for strength and rigidity can be made of metal. Since the plates are effectively insulated from the shaft, the shaft can be journaled to the frame of the condenser in metal bearings. Preferably, the plates of the condenser are rigidly supported by the insulating sleeve and the plates of each set are electrically connected by conductors making electrical contact with all of the plates of each set. Preferably, certain ones of the conductors also serve to maintain the plates in spaced relationship and certain other ones of the conductors serve to anchor the plates to the insulating sleeve.

Referring now to the drawing I have shown a shaft 16, preferably of metal, upon which is rigidly fixed a sleeve 17 of suitable insulating material, such as a phenolic condensate product. If desired, a plurality of sleeves 17 can be mounted on shaft 16 for use in a gang condenser, but for purposes of illustration only one sleeve 17 has been shown. When a phenolic condensate product or other moldable material is employed in sleeve 17, the sleeve can be molded directly about the shaft 16.

As shown in Fig. 2, the sleeve 17 is not of true circular shape and approximately one-half 18 of the sleeve has a radius which is substantially greater than the radius of the remaining portion 19 of the sleeve. The portion 18 of the sleeve 17 is preferably provided with a plurality of semi-circular grooves 21, each of which is adapted to receive one plate of the condenser. The grooves 21 are sufficiently deep to retain the plates firmly in place, but the bottom of each groove preferably has a radius which is greater than the radius of portion 19 of the sleeve, as shown. These grooves can be formed during the molding of the sleeve 17, when the sleeve is of moldable material, or, if desired, they can be formed in any convenient manner, as by grinding, after the sleeve has been formed. When the condenser is in the form of that described in Patent No. 1,618,399, the ribs 22 between the grooves can be made eccentric with the remainder of the sleeve or can be otherwise suitably shaped to form a low central portion 23 for enabling closer mounting of the two rotatable shafts without causing the corners of the plates on one shaft to strike the sleeve on the other shaft. If desired, however, the grooves 21 and the ribs 22 can have uniform dimensions throughout their lengths.

The plates of the condenser can have any suitable shape, but for purposes of illustration I have chosen a plate of substantially rectangular outline and which is suitable for use in a condenser such as that described in my co-pending application above referred to. The edge of plates 24 include a substantially semi-circular portion 26 which has a curvature corresponding to the bottom of the grooves 21 in sleeve 17 and the thickness of the plates 24 is such that each plate is adapted to be inserted in one of the grooves 21 in the manner shown in Fig. 4. A suitable cement or other adhesive can be placed in the grooves 21 for maintaining the plates 24 fixed therein. Preferably, a pair of small ears 27 and 28 are provided at the extremities of the curved portion 26 which are adapted to project slightly beyond the grooves 21 when the plate 24 is inserted therein, as shown in Fig. 4. When the plates are in this position a channel is formed between each of the ears 27 and 28 and the longitudinal shoulder between the parts 18 and 19 of the sleeve. When all of the plates have been assembled in their respective grooves 21 in the sleeve, a plurality of these channels are formed, all of which are in substantial longitudinal alignment.

For further securing the plates 24 in place on the sleeve 17 a continuous wire 29 is inserted in the channels adjacent the ears 27 of the several plates on the sleeve, so that it extends longitudinally of the sleeve and is disposed in the corner formed between the portions 18 and 19 of the sleeve. A similar wire 31 is inserted in a similar manner within the channels adjacent ears 28 and thereafter the ears 27 and the ears 28 are crimped or otherwise distorted about the wires 29 and 31, as shown in Fig. 5. By this expedient, the wires 29 and 31 serve to anchor the plates 24 in the grooves 21. Preferably, the wires 29 and 31 are of conducting material and are caused to make good electrical contact with all of the plates 24 in a single set, whereby they also serve to electrically connect the plates together.

Each of the plates 24 has formed thereon a pair of tabs or projections 32 and 33, each of which has a slot 36 and 37 therein respectively. When the plates 24 have been positioned on sleeve 17 all of the slots 36 in the plates are disposed in substantial alignment and a wire or other conductor 38 is inserted in the slots. When the wire 38 has been placed in the slot 36, the plates are accurately spaced from one another by any suitable means and thereafter the ends of the tabs 32 are crimped or otherwise closed about wire 38, as shown in Fig. 6. A similar wire 39 is placed in the slots 37 and the ends of tabs 33 are then closed about wire 39. Wires 38 and 39, in addition to maintaining the plates 24 in proper spaced relationship also serve to electrically connect all of the plates together.

Thus, while all of the plates of a set are mounted on an insulating sleeve and therefore insulated from the shaft 16 and from the plates of all of the other sets, the plates of each set are electrically connected together in an efficient manner.

While I have shown and described a preferred embodiment of my invention, I do not wish to be limited thereto, since the invention as defined in the appended claims can be embodied in a plurality of other forms.

I claim:

1. In a variable electrical condenser, a shaft, a sleeve of insulating material disposed about a portion of said shaft, said sleeve being formed of two curved portions, one portion having a greater radius of curvature than the other, thereby providing a longitudinal shoulder on said sleeve, said portion of the greater curvature having a plurality of plate retaining grooves therein, and a plate disposed within each groove and an electrical conductor disposed against said shoulder and serving to interconnect electrically all of the plates on said sleeve.

2. In a variable electrical condenser, a shaft, a sleeve of insulating material disposed about a portion of said shaft, said sleeve being formed of two curved portions, one portion having a greater radius of curvature than the other, said portion of the greater curvature having a plurality of plate retaining grooves therein, a plate disposed within each groove, each of said plates having a distorted portion adjacent each extremity of its associated groove, and a wire extending beneath the distorted portions of all of said plates to anchor said plates to the sleeve.

3. In a variable electrical condenser, a shaft, a sleeve of insulating material disposed upon said shaft and fixed thereto, said sleeve being shaped to afford two diametrically opposed shoulders extending longitudinally of the shaft, a plurality of spaced plates mounted upon said sleeve, each of said plates having a portion embracing a part of the periphery of the sleeve and also having ears which overlie said shoulders, and a pair of elongated conductors electrically connecting said ears and also engaging said shoulders.

In testimony whereof, I have hereunto set my hand.

ERNEST G. DANIELSON.